United States Patent

Mutou et al.

(10) Patent No.: US 9,359,958 B2
(45) Date of Patent: Jun. 7, 2016

(54) SEAL MECHANISM FOR USE WITH TURBINE ROTOR

(75) Inventors: Yoshihiko Mutou, Akashi (JP); Ryozo Tanaka, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 13/636,982

(22) PCT Filed: Mar. 16, 2011

(86) PCT No.: PCT/JP2011/056216
§ 371 (c)(1),
(2), (4) Date: Oct. 18, 2012

(87) PCT Pub. No.: WO2011/118474
PCT Pub. Date: Sep. 29, 2011

(65) Prior Publication Data
US 2013/0200571 A1    Aug. 8, 2013

(30) Foreign Application Priority Data

Mar. 24, 2010 (JP) ................................. 2010-067295

(51) Int. Cl.
*F02C 7/28* (2006.01)
*F01D 5/08* (2006.01)
*F01D 11/02* (2006.01)

(52) U.S. Cl.
CPC . *F02C 7/28* (2013.01); *F01D 5/081* (2013.01); *F01D 11/025* (2013.01); *F05D 2300/50212* (2013.01)

(58) Field of Classification Search
CPC . F16J 15/4472; F16J 15/4474; F16J 15/4476; F16J 15/4478

USPC ......... 277/411, 412, 414, 415, 418, 419, 420, 277/372, 373; 415/136, 138, 174.5, 174.4
See application file for complete search history.

(56) References Cited

U.S. PATENT DOCUMENTS

| | | | | | |
|---|---|---|---|---|---|
| 2,824,760 | A | * | 2/1958 | Gits | F16J 15/36 277/373 |
| 3,927,889 | A | * | 12/1975 | Adams, Jr. | F01D 11/00 277/347 |
| 5,222,742 | A | * | 6/1993 | Roberts | 277/420 |
| 5,332,358 | A | * | 7/1994 | Hemmelgarn | F01D 11/001 29/888.02 |

(Continued)

FOREIGN PATENT DOCUMENTS

| | | |
|---|---|---|
| CA | 2548251 A1 | 7/2006 |
| EP | 1731717 A2 | 6/2006 |

(Continued)

*Primary Examiner* — Kristina Fulton
*Assistant Examiner* — L. Susmitha Koneru
(74) *Attorney, Agent, or Firm* — Studebaker & Brackett PC

(57) ABSTRACT

A seal mechanism is provided which comprises a structure capable of accommodating radial expansions of turbine rotor without increasing an axial size thereof and providing a reliable sealing property for the turbine rotor for a long time. The seal mechanism comprises a labyrinth seal 91, 93 defined by a projection 87 provided on the turbine rotor 11B, an outer member 67 provided radially outward of the projection and supported for displacement in a radial direction, and an inner member 69 provided radially inward of the projection and supported for displacement in the radial direction. A thermal expansion rate of the inner member is greater than that of the outer member.

4 Claims, 4 Drawing Sheets

(56) References Cited

U.S. PATENT DOCUMENTS

| | | | | |
|---|---|---|---|---|
| 5,332,361 A * | 7/1994 | Bras | ............... | F04D 29/126 277/397 |
| 5,487,549 A * | 1/1996 | Dalton | ............... | F16J 15/442 277/413 |
| 5,950,308 A * | 9/1999 | Koff et al. | ............... | 29/889.2 |
| 6,357,753 B1 * | 3/2002 | Yamasaki | ............... | F16J 15/002 277/370 |
| 6,390,771 B1 * | 5/2002 | Gervais | ............... | F01D 11/18 415/139 |
| 6,428,012 B1 * | 8/2002 | Amaral | ............... | F16J 15/3472 277/372 |
| 6,647,707 B2 * | 11/2003 | Dev | ............... | 60/39.43 |
| 6,682,299 B2 * | 1/2004 | Bowen et al. | ............... | 415/160 |
| 6,761,034 B2 * | 7/2004 | Niday | ............... | F01D 5/08 415/171.1 |
| 7,241,109 B2 * | 7/2007 | Ferra | ............... | 415/174.5 |
| 7,249,769 B2 * | 7/2007 | Webster | ............... | F01D 11/025 277/410 |
| 7,540,709 B1 * | 6/2009 | Ebert | ............... | F04D 29/083 415/173.7 |
| 7,967,559 B2 * | 6/2011 | Bunker | ............... | 415/173.7 |
| 2006/0275107 A1 * | 12/2006 | Alvanos | ............... | F01D 5/085 415/110 |
| 2011/0062671 A1 * | 3/2011 | Garcia-Crespo et al. | ............... | 277/410 |

FOREIGN PATENT DOCUMENTS

| | | |
|---|---|---|
| GB | 2251040 A | 6/1992 |
| JP | 08-277701 A | 10/1996 |
| JP | 2006-342797 A | 12/2006 |

* cited by examiner

SEAL MECHANISM FOR USE WITH TURBINE ROTOR

TECHNICAL FIELD

The present invention relates to a seal mechanism for use in a gas turbine. For example, the present invention relates to a seal mechanism for sealing members provided, in particular around a turbine rotor in a gas turbine engine.

BACKGROUND OF THE INVENTION

The gas turbine is to combust fuel with combustion air compressed by the compressor to generate high-temperature and high-pressure combustion gas which is ejected into the turbine where it is expanded to extract an output power for driving an electric generator, a propeller, a vehicle or a machine. In order to obtain an elevated power from gas turbine engines, the generated combustion gas is transported into the turbine without loss. In fact, however, a part of the high-temperature combustion gas from the combustors can leak radially outwardly through gaps between connecting portions of annular members in the gas turbine engine, such as supporting members of the rotor blades and the stator blades. Of course, the more an amount of leak air increases, the more the performance of the gas turbine engine decreases.

To minimize the leakage, JP 08-277701 (A) discloses a mechanism in which a labyrinth seal member for sealing around the turbine rotor is supported by flexible members to move in radial directions. According to this mechanism, when the turbine rotor expands radially by the centrifugal force and/or heat to displace the sealing portions radially, the labyrinth seal member accommodates the radial movements of the sealing positions to maintain the sealing abilities thereof.

The sealing mechanism needs multi-stage tortuous paths to ensure a reliable seal for the turbine rotor which may significantly affect the performance of the gas turbine engine, which increases a size of the labyrinth seal in a axial direction. This causes the sealing members to deform considerably due to small differences of the heat expansions between sealing members and/or of the centrifugal force applied thereto and, as a result, a repetition of the deformations may damage the sealing members.

Accordingly, the present invention is to overcome those problems and for this purpose to provide a seal mechanism of the gas turbine which is capable of accommodating radial expansions of the turbine rotor without accompanying any increase in size in the axial direction and of sealing the turbine rotor in a reliable manner for a long time.

SUMMARY OF THE INVENTION

A seal mechanism according to an embodiment of the invention is used with a turbine rotor in a gas turbine engine. The seal mechanism comprises a labyrinth seal defined by a projection provided on the turbine rotor, an outer member provided radially outward of the projection and supported for displacement in a radial direction, and an inner member provided radially inward of the projection and supported for displacement in the radial direction, wherein a coefficient of thermal expansion of the inner member is greater than that of the outer member. Preferably, a difference between the coefficient of thermal expansion of the inner and outer members is $2 \cdot 10^{-6}/^\circ C. - 6 \cdot 10^{-6}/^\circ C.$ According to the mechanism, an improved sealing performance is provided at the radially outward portion of the labyrinth seal by the cooperation between the projection of the turbine rotor which displaces radially outwardly due to thermal expansion thereof and/or centrifugal force applied thereto and the outer member with less thermal expansion. An improved sealing performance is also provided at the radially inward portion of the labyrinth seal by the cooperation between the projection of the turbine rotor and the inner member which provides larger heat-expansion. Therefore, the seal mechanism provides an enhanced sealing property without increasing the axial size of the labyrinth seal.

The outer member may bear an abradable material on a portion thereof opposing the projection. Also, the inner member bears an abradable material on a portion thereof opposing the projection. According to the embodiments, abrasions of the projection and the outer and inner members defining the labyrinth seal is significantly reduced, which considerably increases a duration of the labyrinth seal.

According to the invention, the mechanism accommodates the radial expansion of the turbine rotor without causing any size increase in the axial direction and ensures a long-term reliable sealing for the turbine rotor, which ensures enhanced performance and reliability of the gas turbine engine.

BRIEF DESCRIPTIONS OF THE DRAWINGS

PREFERRED EMBODIMENT OF THE INVENTION

With reference to the accompanying drawings, a sealing mechanism according to a preferred embodiment of the invention will be described below. Like reference numbers denote like or similar parts throughout the specification. Although directional or positional terminologies such as "front" and "rear" are used in the following descriptions for the better understandings of the invention, they should not be construed to limit the technical scope of the invention. For example, one side adjacent the compressor in the gas turbine is referred to as "front" and the opposite side adjacent the turbine is referred to as "rear" in the following descriptions.

Figure 1:
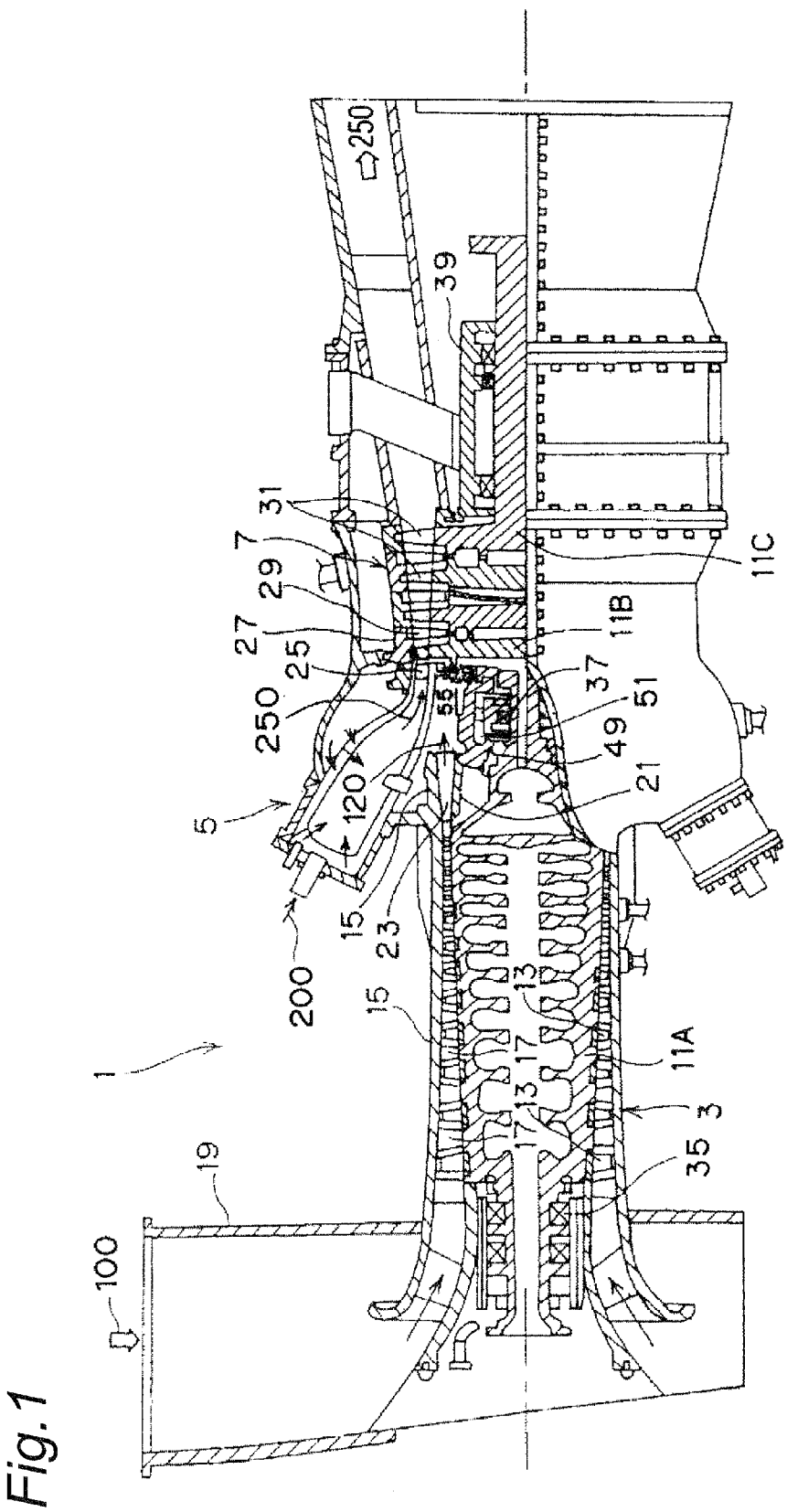
FIG. 1 is a cutout side elevation of a gas turbine engine which uses a seal mechanism for use with a turbine rotor according the embodiment of the invention.

As shown in FIG. 1, the gas turbine engine generally indicated at 1 comprises a compressor 3 for compressing atmospheric intake air 100, combustors 5 for combusting fuel 200 ejected therein with the compressed air to generated a combustion gas 250 and a turbine 7 which drives using the high-temperature and high-pressure combustion gas.

The embodiment uses the axial compressor 3. The axial compressor 3 comprises a compressor rotor 11A. The compressor rotor 11A constitutes a front portion of the rotational member of the gas turbine 1 and comprises an outer peripheral surface securely bearing a number of rotor blades 13 which cooperate with stator blades 17 securely mounted on an inner peripheral surface of the housing 15 of the turbine 1 to compress the intake air 100 from an intake cylinder 19. A diffuser 23 is defined on the downstream side of the compressor 3 between the outer housing 15 and an inner cylindrical wall to guide the compressed air 120 into the combustors 5 through the diffuser 23.

The combustors 5 are provided at regular intervals in the peripheral direction to combust the mixture of the fuel 200 injected therein and the compressed air 120 from the compressor 3 to generate high-temperature and high-pressure combustion gas 250 which is then supplied into the turbine 7 through a turbine nozzle 25 defining a first stage stator blade of the turbine.

The turbine 7 comprises front and rear turbine rotors, i.e., high-pressure turbine rotor 11B and low pressure turbine rotor 11C constituting a rear portion of the rotational member of the gas turbine 1 and a turbine casing 27 surrounding the turbine rotors 11B and 11C. The high pressure turbine rotor 11B is connected to the turbine rotor 11A so that the rotation of the turbine rotor 11B is transmitted to the turbine rotor 11A. The turbine rotor 11B is drivingly disconnected from the turbine rotor 11C. A plurality stages of turbine stator blades 29 are securely mounted on the inner peripheral surface of the turbine casing 27 and a plurality stages of turbine rotor blades 31 are securely mounted on the high-pressure and low-pressure turbine rotors 11B and 11C so that each rotor blade 31 positions adjacent to and on the downstream side of the corresponding stator blade 29.

The rotors 11A, 11B and 11C are as a whole supported for rotation by three bearings 35, 37 and 39 provided at front, central and rear portions of the housing 15, respectively. The central bearing 37 is surrounded by a bearing housing 49 which defines a bearing receiving chamber 51 between the bearing housing 49 and the rotor 11A. The bearing housing 49 is connected to a rear end of the diffuser peripheral wall 21 of the diffuser 23 by bolts not shown so that a compressed-air transporting cavity 55 for transporting the compressed air 120 from the diffuser 23 to the combustors 5 is defined on the downstream side of the diffuser 23 between the bearing housing 49 and the combustors 5.

Figure 2:
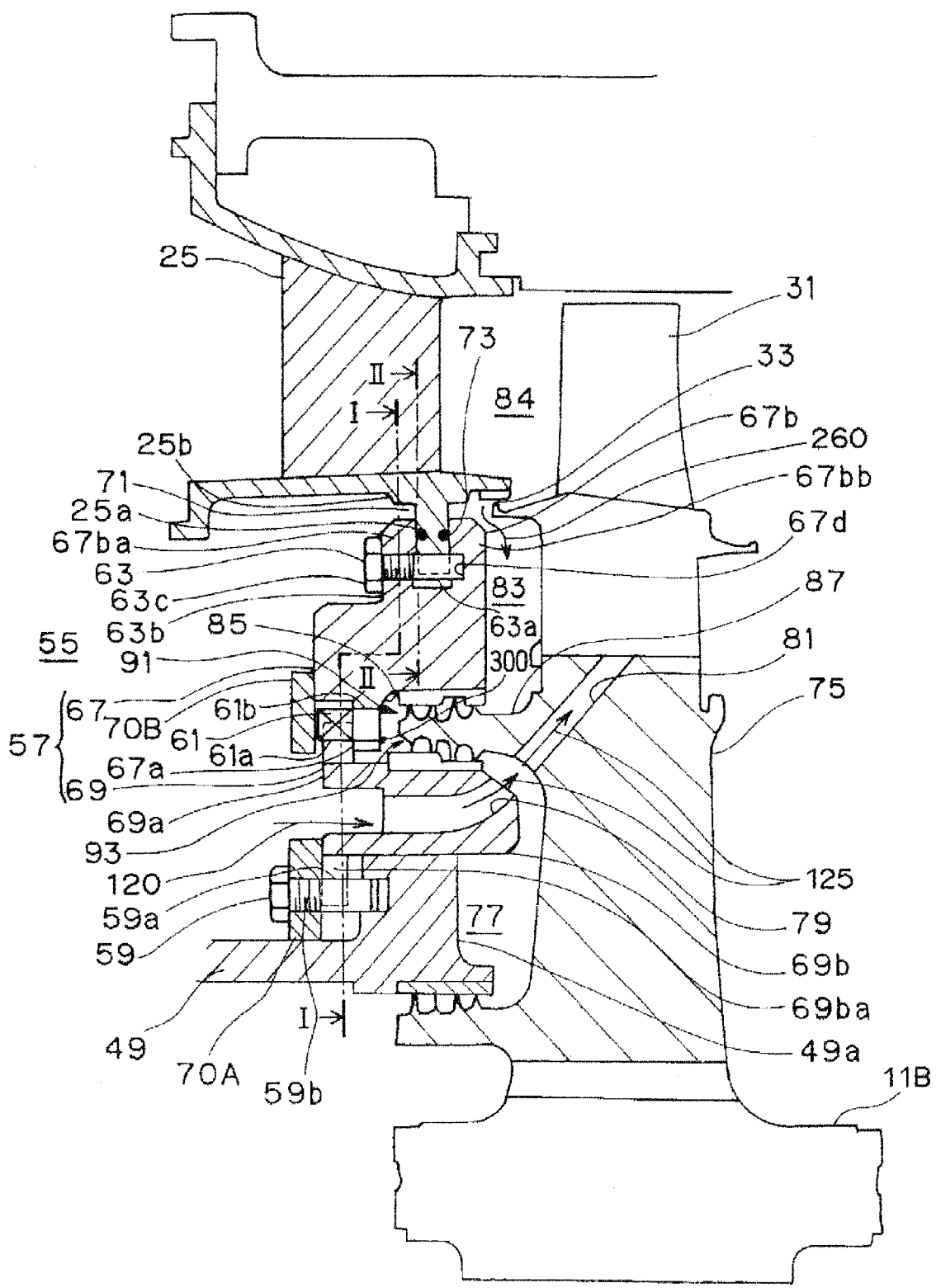
FIG. 2 is a partial longitudinal cross section of the sealing mechanism according to the embodiment of the invention.

As shown in FIG. 2, an adaptor ring 57 is provided between the rear end 49a of the bearing housing 49 and the connection flange 25a projecting inwardly from the turbine nozzle 25 and connected thereto through first and third connection members 59 and 63, respectively. The adaptor ring 57 is a two-part annular member made of outer member 67 and inner member 69. Also, an inward end 67a of the outer member 67 and an outward end 69a of the inner member 69 are connected to each other by a second connection member 61. Further, an outward end of the adaptor ring 57, i.e., an outward end 67b of the outer member 67 is connected to the connection flange 25a projected inwardly from the turbine nozzle 25 by the third connection member 63.

The bearing housing 49, the inner member 69 and the outer member 67 of the adaptor ring 57 and the turbine nozzle 25 are connected in this order through the first to third connection members 59, 61 and 63, respectively, so that they are relatively immovable in the peripheral direction but relatively movable in the radial direction. This is accomplished by the engagements of the first to third connection members 59, 61 and 63 with radially extending recesses or slots defined in the turbine nozzle 25 and the inner member 69, which will described below.

Figure 3A:
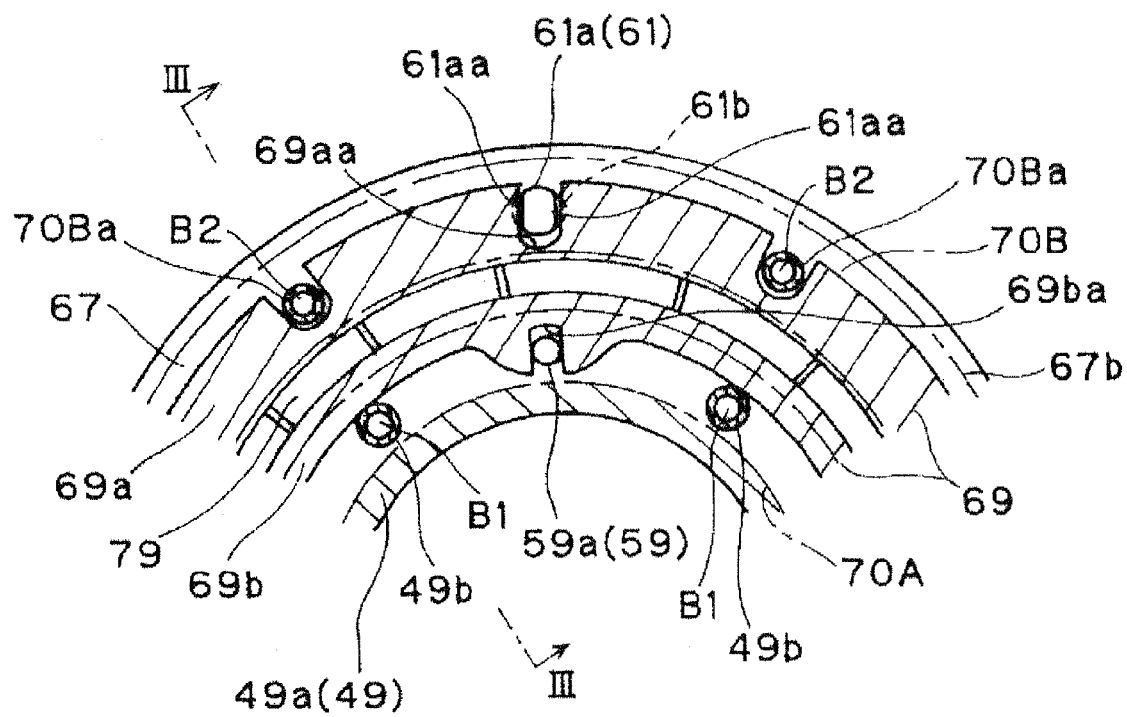
FIG. 3A is a partial transverse cross section of the seal mechanism taken along lines I-I in FIG. 2 which illustrates a connection between first and second connection members.

As shown in FIG. 2, each of the first connection members 59 is extended through the annular, first restriction member 70A and secured thereto by the engagement between the male threads 59b defined on the front end of a shaft portion of the first connection member 59 and the female threads defined in the first restriction member 70A. As shown in FIG. 3A, the rear end of the shaft portion of the first connection member 59 is in the form of cylindrical pin with a circular cross section. The inward end 69b of the inner member 69 has engagement portions 69ba made of radially extending recesses or slots having a peripheral length substantially the same as the external diameter of the first connection member 59 and a radial length larger than the external diameter of the first connection member 59. Therefore, the engagements of the first connection members 59 with the engagement portions 69ba of the inner member 69 allow that the inner member 69 is movable relative to the bearing housing 49 in the radial direction but immovable relative to the bearing housing 49 in the peripheral direction. In addition, the inner member 69 can move in the axial direction relative to the bearing housing 49 between the first restriction member 70A and the opposed bosses 49b defined on the bearing housing.

Figure 4:
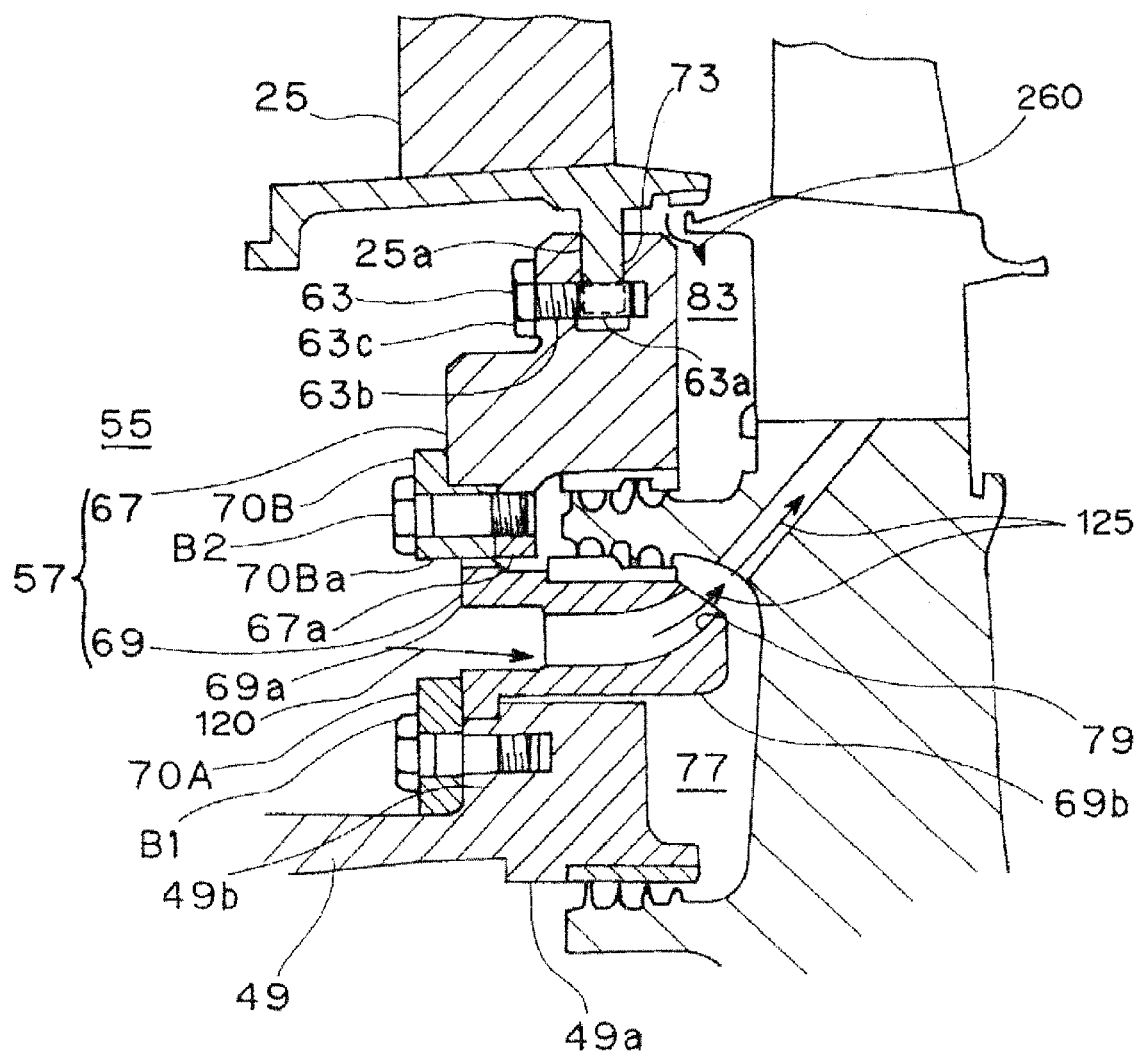
FIG. 4 is a partial longitudinal cross section take along lines in FIG. 3A.

The first restriction member 70A is secured to the bearing housing 49 by bolts B1 arranged at positions peripherally different from those of the first connection members 59. For example, as shown in FIG. 4, the first restriction member 70A is secured to the bearing housing 49 by bolts B1 engaged in respective bosses 49b defined in the bearing housing 49 so that the first restriction member 70A covers the inner engagement portions 69ba of the inner member 69 shown in FIG. 2.

The second connection members 61, each in the form of pin without head or threads, are secured to the inner peripheral end 67a of the outer member 67 with rear end portions 61b thereof extended therethrough and secured by welding 300. As shown in FIG. 3A, the front end portion 61a of the second connection member 61 has a pair of parallel and diametrically opposing flat surface portions 61aa extending in the axial direction thereof. Correspondingly, the outer peripheral end 69a of the inner member 69 has engagement portions 69aa each made of slot having substantially the same peripheral length as the distance between the opposed flat surface portions 61aa and the radial length larger than the diameter of the from end portion 61a. Therefore, the engagements of the second connection members 61 with the engagement portions 69aa allow that the inner member 69 is movable relative to the outer member 67 in the radial direction but immovable relative to the outer member 67 in the peripheral direction.

The annular second restriction member 70B is secured on the front of the inner peripheral end 67a of the outer member 67 by the bolts B2 arranged at positions peripherally different from those of the second connection members 61. For example, as shown in FIG. 4, the second restriction member 70B is secured to the outer member 67 by bolts B2 extended through the bosses 70B defined in the second restriction member 7 and engaged with the inner end portion 67a of the outer member 67. The second connection members 61 are covered by the second restriction member 70B. The inner member 69 can move in the axial direction relative to the outer member 67 between the second restriction member 70B and inner end 67a of the outer member 67.

Figure 3B:
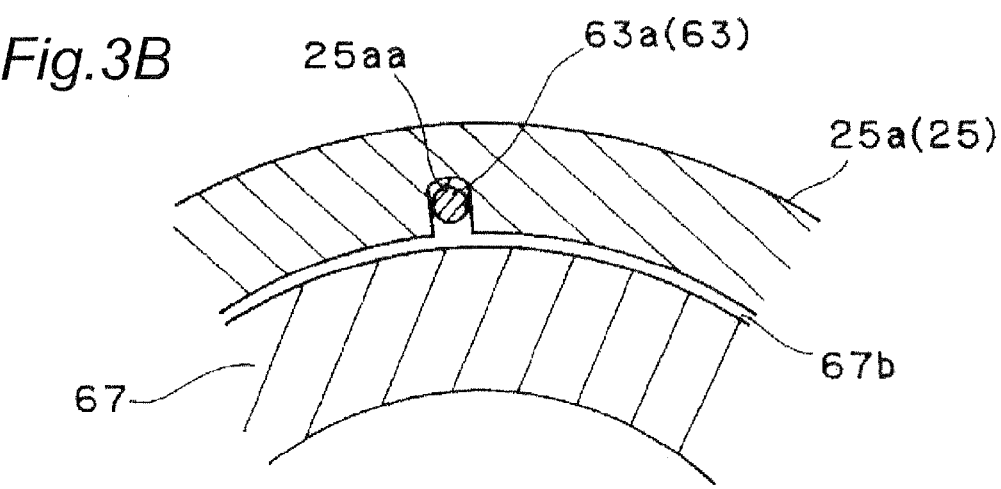
FIG. 3B is a partial transverse cross section of the seal mechanism taken along lines II-II in FIG. 2 which illustrates a connection using a third connection member.

The third connection member 63 has a head portion 63c and a shaft or pin portion with threads 63b provided adjacent the head portion. The outer portion 67b of the outer member 67 has a radially outwardly opened annular groove defined between front and rear annular walls 67ba and 67bb. The front wall 67ba has female threaded holes defined therein in which the male threaded portion 63b of the third connection members 63 is engaged. The rear wall 67bb has engagement holes 67b in which the distal pin portions 63a of the third connection member's 63 are fitted. As shown in FIG. 3b, the connection flange 25a of the turbine nozzle 25 has engagement portions 25aa similar to the engagement portions 69ba of the inner member 69. Therefore, the engagements of the engagement portions 25aa of the turbine nozzle 25 with the pin members 63a of the third connection member 63 allow that the outer member 67 is movable relative to the turbine nozzle 25 in the radial direction but immovable relative to the turbine nozzle 25 in the peripheral direction.

Three or more connection members 59, 61 and 63 and engagement portions 69aa, 69bb and 25aa are provided at regular intervals in the peripheral direction. As shown in FIG. 2, the assembling of the gas turbine engine 1 results in a gap 71 between the outer end portion 67b of the outer member 67 and the proximal portion 25b of the connection flange 25a of the turbine nozzle 25. Also, sealing members 73 are provided between the connection flange 25a of the turbine nozzle 25 and the opposed portions of the outer member 67.

Discussions will be made to a sealing arrangement provided between the adaptor ring 57 and the first-sage rotor blade 31. As shown in FIG. 2, the turbine rotor blade 31 is provided on outer peripheral end of the rotor disk 75 defining the high-pressure turbine rotor 11B. The inner member 69 of the adaptor ring 57 has passages 79 therein for guiding a part of the compressed air 120 from the compressed-air transporting cavity 55 to the inner cavity 77 defined between the inner member 69 and the rotor disk 75. The rotor disk 75 has passages 81 defined therein to oppose the passages 79 for guiding air 125 for cooling the rotor disk 75. This allows that the air 125 flows from the cavity 55 through the passages 95, the inner cavity 77 into the passages 81 to cool the rotor disk 75 internally and externally. Also, a part of the high-temperature combustion gas G flows through a gap 33 between the rotatable first stage turbine rotor blade 31 and the non-rotatable turbine nozzle 25 into the outer cavity between the outer member 67 of the adaptor ring 57 and the rotor disk 75.

An annular recess 85 is defined on the rear side at the connection between the outer and inner members 67 and 69 of the adaptor ring 57. Correspondingly, the rotor disk 75 has a peripherally-extending annular projection 87 defined integrally therewith and projecting forwardly. The annular projection 87 has a plurality inner and outer annular ridges 89 to form a labyrinth seal mechanism made of an inner labyrinth seal 91 for sealing between the projection 87 and the outer member 67 and an outer labyrinth seal 93 for sealing between the projection 87 and the inner member 69, which seals between the outer cavity into which the high-temperature combustion gas 260 enters and the inner cavity 77 into which the cooling air 125 enters. This prevents a deterioration of the cooling effect which would otherwise be caused by the flowing of the high-temperature combustion gas 260 from the outer cavity 83 into the inner cavity 77.

The outer and inner members 67 and 69 support honeycomb abradable members 95 secured on respective portions thereof opposing the labyrinth ridges 89 of the projection 87, which reduces abrasions of the projection 87 and the outer and inner members 67 and 69 of the labyrinth seal mechanism to extend duration of the sealing mechanism. Preferably, the abradable members 95 are made of ferronickel alloy.

The inner member 69 of the adaptor ring 57 is made of material having a greater coefficient of thermal expansion than that of the outer member 67. Preferably, a difference of coefficient of thermal expansion between the inner and outer members 69 and 67 is about $2 \cdot 10^{-6}/°$ C.–$6 \cdot 10^{-6}/°$ C., more preferably about $3 \cdot 10^{-6}/°$ C.–$5 \cdot 10^{-6}/°$ C. In the embodiment, the inner member 69 is made of stainless steel SUS321 and the outer member 67 is made of Ni-based heat-resistant alloy such as WASPALOY®. Coefficients of thermal expansion of SUS321 and WASPALOY® are about $18 \cdot 10^{-6}/°$ C. and about $14 \cdot 10^{-6}/°$ C., so that a difference between them is about $4 \cdot 10^{-6}/°$ C.

According to the embodiment, the seal mechanism of the turbine rotor has an enhanced sealing property because the inner member 69 is made of material of which coefficient of thermal expansion coefficient is greater than that of the outer member 67. Specifically, because the turbine rotor (high-pressure turbine rotor 11B) expands radially outwardly due to thermal expansion thereof and/or centrifugal force applied thereto and thereby the projection 87 displaces radially outwardly, the outer member 67 provides less thermal expansion in the radial direction and thereby an elevated sealing property is maintained at the outer labyrinth seal 91 by the cooperation between outer portion of the projection 87 and the outer member 67 with less coefficient of thermal expansion. Simultaneously, the inner member 69 with greater coefficient of thermal expansion exhibits greater thermal expansion in the radial direction to accommodate the displacement of the projection 87, which ensures a reliable sealing property in the inner labyrinth seal 93. As above, an elevated and reliable sealing property is ensured to the sealing mechanism without increasing the axial size of the sealing mechanism.

For example, the embodiment in which four labyrinth ridges are provided in the inner and outer surfaces of the projection 87 needs an axial size similar to that required the seal mechanism with four labyrinth ridges on inner or outer surface but provides a sealing property similar to that obtained by the seal mechanism with eight labyrinth ridges on inner or outer surface. It should be noted that the number of labyrinth ridges provided on the inner and/or outer surfaces of the projection 87 is not restrictive to the invention.

It should be noted that the above described embodiments are illustrative and the present invention is not limited by the embodiments. The present invention includes not only the above-described embodiments but also every modification defined by the claims and equivalents thereof.

PARTS LIST

1: Gas Turbine Engine
3: Compressor
5: Combustor
7: Turbine
11B: High-pressure Turbine Rotor
57: Adaptor Ring
67: Outer Member
69: Inner Member
87: Projection
89: Labyrinth Ridge
91: Outer Labyrinth Seal
93: Inner Labyrinth Seal
100: Intake Air
120: Compressed Air
125: Cooling Air
200: Fuel
250: Combustion Gas

What is claimed is:

1. A seal mechanism for a turbine rotor in a gas turbine engine, comprising:
   a labyrinth seal defined by
      an annular cylindrical projection provided on the turbine rotor so that the annular cylindrical projection extends about a longitudinal axis of the turbine rotor,
      an outer ring member provided radially outward of the projection, and
      an inner ring member provided radially inward of the projection,
   wherein the inner ring member has an outer periphery, the outer periphery including grooves extending in a direction parallel to the longitudinal axis of the turbine rotor formed on the outer periphery and spaced at intervals in a peripheral direction of the ring member, the outer ring member includes pins extending parallel to the longitudinal axis of the turbine rotor, and the pins are engaged in the grooves so that the inner member is movable in the radial direction of the turbine rotor but immovable in a peripheral direction of the turbine rotor relative to the outer ring member, wherein the inner and outer ring members are made of different materials and a coefficient of thermal expansion of the material of the inner member is greater than that of the outer member.

2. The seal mechanism of claim 1, wherein a difference between the coefficients of the thermal expansion of the inner and outer ring members is $2 \cdot 10^{-6}/°C. - 6 \cdot 10^{-6}/°C$.

3. The seal mechanism of claim 1, wherein the outer ring member bears an abradable material on a portion thereof opposing the projection.

4. The seal mechanism of claim 1, wherein the inner ring member bears an abradable material on a portion thereof opposing the projection.

\* \* \* \* \*